United States Patent
Kozakai

(10) Patent No.: US 10,320,235 B2
(45) Date of Patent: *Jun. 11, 2019

(54) POWER FEEDING DEVICE, POWER RECEIVING DEVICE AND WIRELESS POWER FEEDING SYSTEM

(71) Applicant: Sony Corporation, Tokyo (JP)

(72) Inventor: Osamu Kozakai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 579 days.

This patent is subject to a terminal disclaimer.

(21) Appl. No.: 14/842,524

(22) Filed: Sep. 1, 2015

(65) Prior Publication Data

US 2015/0372506 A1  Dec. 24, 2015

Related U.S. Application Data

(63) Continuation of application No. 12/985,395, filed on Jan. 6, 2011, now Pat. No. 9,153,969.

(30) Foreign Application Priority Data

Jan. 14, 2010 (JP) .................. 2010-006091

(51) Int. Cl.
| | | |
|---|---|---|
| *H02J 5/00* | (2016.01) | |
| *H02J 50/12* | (2016.01) | |
| *H02J 17/00* | (2006.01) | |
| *H01F 27/28* | (2006.01) | |
| *H01F 38/14* | (2006.01) | |

(52) U.S. Cl.
CPC .......... *H02J 50/12* (2016.02); *H01F 27/2871* (2013.01); *H02J 5/005* (2013.01); *H02J 17/00* (2013.01); *H01F 38/14* (2013.01)

(58) Field of Classification Search
CPC .................. H02J 5/005; H01F 38/14
USPC .......................... 307/104; 320/108
See application file for complete search history.

(56) References Cited

U.S. PATENT DOCUMENTS

| | | |
|---|---|---|
| 7,521,890 B2 | 4/2009 | Lee et al. |
| 8,378,524 B2 | 2/2013 | Mita |
| 8,538,330 B2 | 9/2013 | Baarman |
| 8,569,914 B2 | 10/2013 | Karalis et al. |
| 9,153,969 B2 * | 10/2015 | Kozakai ............ H02J 5/005 |
| 2004/0130915 A1 | 7/2004 | Baarman |
| 2004/0130916 A1 | 7/2004 | Baarman |
| 2004/0150934 A1 | 8/2004 | Baarman |
| 2005/0007067 A1 | 1/2005 | Baarman et al. |
| 2007/0145909 A1 | 6/2007 | Baarman et al. |
| 2007/0171681 A1 | 7/2007 | Baarman |
| 2008/0001572 A9 | 1/2008 | Baarman |

(Continued)

FOREIGN PATENT DOCUMENTS

JP  2006-518179  8/2006

*Primary Examiner* — Rexford N Barnie
*Assistant Examiner* — Elim Ortiz
(74) *Attorney, Agent, or Firm* — Dentons US LLP

(57) ABSTRACT

Disclosed herein is a power feeding device including a power transmitter adapted to generate a plurality of transmission signals at different frequencies including at least power to be fed; a power feeding element that is fed with transmission signals including power generated by the power transmitter; and a plurality of resonance elements that have different resonance frequencies and are provided where they can be coupled with the power feeding element by electromagnetic induction.

11 Claims, 15 Drawing Sheets

(56) References Cited

U.S. PATENT DOCUMENTS

| | | |
|---|---|---|
| 2009/0015075 A1 | 1/2009 | Cook et al. |
| 2009/0212628 A1 | 8/2009 | Baarman |
| 2010/0033021 A1* | 2/2010 | Bennett .................. H02J 17/00 |
| | | 307/104 |
| 2010/0033023 A1 | 2/2010 | Baarman |
| 2010/0052431 A1 | 3/2010 | Mita |
| 2010/0103702 A1 | 4/2010 | Baarman |
| 2013/0320760 A1* | 12/2013 | Kim ....................... H02J 17/00 |
| | | 307/11 |
| 2016/0164303 A1* | 6/2016 | Ku ......................... H02J 7/025 |
| | | 307/104 |
| 2017/0085116 A1* | 3/2017 | Tsao ....................... H02J 50/12 |

\* cited by examiner

POWER FEEDING DEVICE, POWER RECEIVING DEVICE AND WIRELESS POWER FEEDING SYSTEM

RELATED APPLICATION DATA

This application is a continuation of U.S. patent application Ser. No. 12/985,395 filed Jan. 6, 2011, the entirety of which is incorporated herein by reference to the extent permitted by law. The present application claims the benefit of priority to Japanese Patent Application No. JP 2010-006091 filed on Jan. 14, 2010 in the Japan Patent Office, the entirety of which is incorporated by reference herein to the extent permitted by law.

BACKGROUND OF THE INVENTION

1. Field of the Invention

The present invention relates to a noncontact power feeding type power feeding device, power receiving device and wireless power feeding system for supplying and receiving power in a noncontact (wireless) manner.

2. Description of the Related Art

The electromagnetic induction method is known to supply power wirelessly.

On the other hand, recent years have seen attention focused on wireless power feeding and charging systems using a method called the magnetic field resonance method that relies on the electromagnetic resonance phenomenon.

The currently popular noncontact feeding method based on the electromagnetic induction method requires that the source and destination of power (power receiving side) have to share a magnetic flux. For efficient power transmission, the source and destination of power have to be arranged extremely close to each other. Further, coupling alignment is also essential.

On the other hand, the noncontact power feeding method based on the electromagnetic resonance phenomenon is advantageous in that it allows for power transmission over a longer distance than the electromagnetic induction method thanks to the principle of the electromagnetic resonance phenomenon, and that the transmission efficiency does not degrade much even with somewhat poor alignment.

It should be noted that the electric field resonance method is another method based on the electromagnetic resonance phenomenon.

For example, Patent Document 1 discloses a wireless power feeding system relying on the electromagnetic induction method.

The technique disclosed in JP-T-2006-518179 (hereinafter referred to as Patent Document 1) detects the change in load with a circuit sensor in the noncontact power feeding device and changes the inductance of the variable inductor and the capacitance of the variable capacitor, thus ensuring optimal operating frequency of the system.

In other words, the technique disclosed in Patent Document 1 adjusts the circuit if the operating frequency is not optimal.

SUMMARY OF THE INVENTION

In the configuration example disclosed in the above Patent Document 1, the operating frequency of the system is adjusted to be optimal if it not optimal.

More specifically, if the frequency deviates from the optimal one due, for example, to the arrangement of the power receiving device, a possible remedy would be to optimize the frequency by adjusting the frequency of the circuit.

In addition to the above, however, it may become necessary to change the operating frequency although power can be fed without any problem at the current frequency.

For example, when one wishes to transmit power and information, it may be necessary to change the frequencies to prevent interference or to comply with laws and regulations.

Further, it may become necessary to switch to other frequency because of the discovery that the operating frequency is used for other purpose. Still further, one may wish to use a plurality of frequency bands simultaneously in a parallel manner.

In such cases, the frequency has to be adjusted not only on the circuit side but also on the coil side. However, the technique described in the above Patent Document 1 is unable to adjust the frequency on the coil side.

It is an aim of the present invention to provide a power feeding device, power receiving device and wireless power feeding system that can operate at a plurality of frequencies and can flexibly address the need for switching between frequencies.

A power feeding device according to a first mode of the present invention includes a power transmitter, power feeding element and a plurality of resonance elements. The power transmitter generates a plurality of transmission signals at different frequencies including at least power to be fed. The power feeding element is fed with the transmission signals including power generated by the power transmitter. The plurality of resonance elements have different resonance frequencies and are provided where they can be coupled with the power feeding element by electromagnetic induction.

A power receiving device according to a second mode of the present invention includes a plurality of resonance elements, power feeding element and power receiver. The plurality of resonance elements have different resonance frequencies and receive transmission signals including power transmitted by magnetic field resonance relationship. The power feeding element is fed with power received as a result of coupling with the resonance elements by electromagnetic induction to receive power. The power receiver processes the reception signals including power received by the power feeding element.

A wireless power feeding system according to a third mode of the present invention includes a power feeding device and power receiving device. The power receiving device receives transmission signals including power from the power feeding device by magnetic field resonance relationship. The power feeding device includes a power transmitter, power feeding element and at least one resonance element. The power transmitter generates a plurality of transmission signals at different frequencies including at least power to be fed. The power feeding element is fed with the transmission signals including power generated by the power transmitter. The resonance element is provided where it can be coupled with the power feeding element by electromagnetic induction. The power receiving device includes at least one resonance element, power feeding element and power receiver. The resonance element receives transmission signals including power transmitted by magnetic field resonance relationship. The power feeding element is fed with power received as a result of coupling with the resonance element by electromagnetic induction to receive power. The power receiver processes the transmission signals including power received by the power feeding element. At least one of the resonance elements of the power feeding device and power receiving device includes a plurality of resonance elements having different resonance frequencies.

The present invention permits use of a plurality of frequencies and flexibly addresses the need for switching between frequencies.

DETAILED DESCRIPTION OF THE PREFERRED EMBODIMENT

A description will be given below of an embodiment of the present invention with reference to the accompanying drawings.

It should be noted that the description will be given in the following order:
1. Configuration examples of the wireless power feeding system
2. Example of arrangement of resonance coils
3. Principle of the magnetic field resonance method
4. Operation for transmission and reception of power and a signal using a plurality of frequencies <1. Configuration Examples of the Wireless Power Feeding System>

Figure 1:
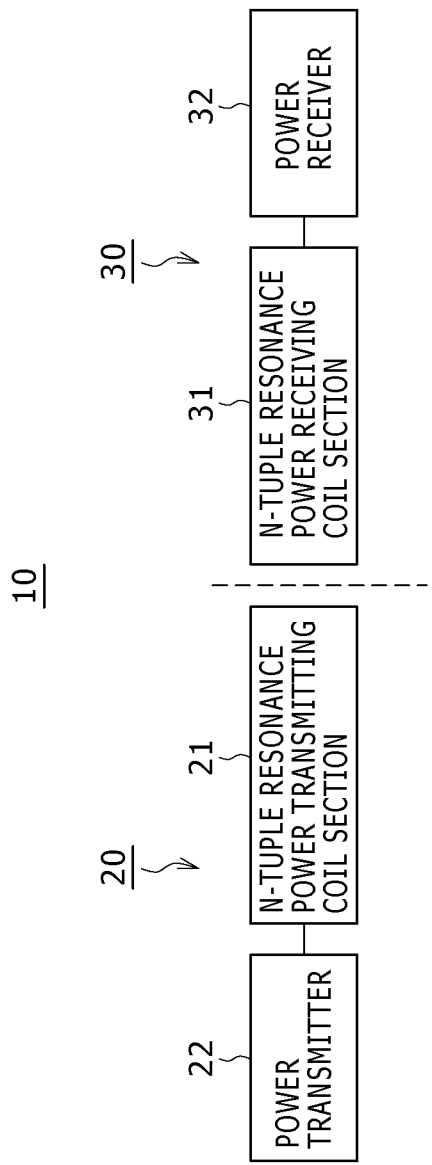
FIG. 1 is a block diagram illustrating a configuration example of a wireless power feeding system according to an embodiment of the present invention.

FIG. 1 is a block diagram illustrating a configuration example of a wireless power feeding system according to an embodiment of the present invention.

Figure 2:
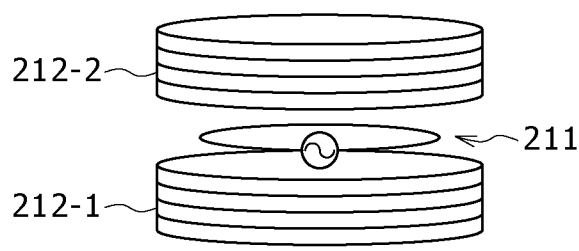
FIG. 2 is a diagram illustrating a first configuration example of power transmitting side coils of the wireless power feeding system according to the embodiment of the present invention.

FIG. 2 is a diagram illustrating a first configuration example of power transmitting side coils of the wireless power feeding system according to the embodiment of the present invention.

Figure 3:
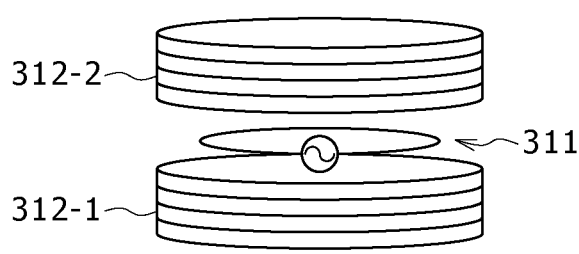
FIG. 3 is a diagram illustrating a first configuration example of power receiving side coils of the wireless power feeding system according to the embodiment of the present invention.

FIG. 3 is a diagram illustrating a first configuration example of power receiving side coils of the wireless power feeding system according to the embodiment of the present invention.

A wireless power feeding system 10 includes a power feeding device 20 and power receiving device 30.

The power feeding device 20 includes a power transmitting coil section 21 and power transmitter 22.

The power transmitting coil section 21 includes a power feeding coil 211 serving as a power feeding element and a plurality 'n' (where n=2 in the example shown in FIG. 2) of resonance coils 212-1 and 212-2 serving as resonance elements. Although also called a resonance coil, a resonance coil is referred to as such in the present embodiment.

The power feeding coil 211 is formed with an air-core coil that is fed with AC current from the power transmitter 22.

The power feeding coil 211 is impedance-matched at the power feeding point by a matching circuit included, for example, in the power transmitter 22.

The resonance coils 212-1 and 212-2 are each formed with an air-core coil that is coupled with the power feeding coil 211 by electromagnetic induction. A magnetic field resonance relationship is established when the self-resonance frequency of these coils matches that of a resonance coil 312 of the power receiving device 30, thus allowing for highly efficient power transmission.

The resonance coils 212-1 and 212-2 are disposed within the distance which allows for coupling with the power feeding coil 211 by electromagnetic induction.

It should be noted, however, that the resonance coils 212-1 and 212-2 are disposed in such a manner as not to be orthogonal with the power feeding coil 211.

In the example shown in FIG. 2, the resonance coils 212-1 and 212-2 respectively having different resonance frequencies f1 and f2 are disposed one on each side of the power feeding coil 211. The single power feeding coil 211 can be shared.

It should be noted that we assume that the resonance frequencies f1 and f2 are set so that f1<f2.

The power transmitter 22 generates two sine waves or a sine wave and high frequency modulated signal to be transmitted at the plurality of frequencies f1 and f2 and feeds the generated transmission signals at the frequencies f1 and f2 to the power feeding coil 211.

The power transmitter 22 can be configured, for example, to include two capabilities, one to generate a power transmission sine wave at the first frequency f1, and another to generate a high frequency modulated signal at the second frequency f2, and transmit power and a signal using two frequencies.

Alternatively, the power transmitter 22 can be configured, for example, to include two capabilities, one to generate a power transmission sine wave at the first frequency f1, and another to generate a power transmission sine wave at the second frequency f2, and transmit power by switching between the two frequencies in time.

The power receiving device 30 includes a power receiving coil section 31 and power receiver 32.

The power receiving coil section 31 includes a power feeding coil 311 serving as a power feeding element and a plurality 'n' (where n=2 in FIG. 3) of resonance coils 312-1 and 312-2 serving as resonance elements.

The power feeding coil 311 is fed with AC current from the resonance coils 312-1 and 312-2 by electromagnetic induction.

The power feeding coil 311 is impedance-matched at the load connection point by a matching circuit included, for example, in the power receiver 32.

The resonance coils 312-1 and 312-2 are each formed with an air-core coil that is coupled with the power feeding coil 311 by electromagnetic induction. A magnetic field resonance relationship is established when the self-resonance frequency of these coils matches that of the resonance coil 212-1 or 212-2 of the power feeding 20, thus allowing for highly efficient power transmission.

The resonance coils 312-1 and 312-2 are disposed within the distance which allows for coupling with the power feeding coil 311 by electromagnetic induction.

It should be noted, however, that the resonance coils 312-1 and 312-2 are disposed in such a manner as not to be orthogonal with the power feeding coil 311.

In the example shown in FIG. 3, the resonance coils 312-1 and 312-2 both having the different resonance frequencies f1 and f2 are disposed one on each side of the power feeding coil 311. The single power feeding coil 311 can be shared.

The power receiver 32 performs rectification, voltage stabilization, demodulation and other processes of the received two sine waves or sine wave and high frequency modulated signal at the plurality of frequencies f1 and f2 supplied via the power feeding coil 311.

The power receiver 32 includes, for example, a capability to rectify received AC power, i.e., a power transmission sine wave at the first frequency f1, convert the rectified DC power into a DC voltage compliant with the specification of electronic equipment, i.e., the destination, and supply the stabilized DC voltage to the processor of the electronic equipment.

In parallel therewith, the power receiver 32 can be configured to include a capability to demodulate a received high frequency modulated signal at the second frequency.

Alternatively, the power receiver 32 may be configured to include, for example, a capability to rectify and stabilize power transmission sine waves, one at the first frequency f1 and another at the second frequency f2, and supply the stabilized DC voltages to the processor of the electronic equipment.

Although a description has been given above of the configuration and arrangement in which both the power transmitting coil section 21 of the power feeding device 20 and the power receiving coil section 31 of the power receiving device 30 include a plurality of resonance coils, the present invention is not limited thereto. Alternatively, the power transmitting coil section 21 and power receiving coil section 31 may be configured and arranged as described in the example given below.

It should be noted, however, that the configuration and arrangement which will be described below are also merely an example.

<2. Example of Arrangement of Resonance Coils>

A description will be given here of an example of arrangement of the resonance coils with reference to not only FIGS. 2 and 3 but also FIGS. 4 to 8.

In the example shown in FIG. 2, the resonance coils 212-1 and 212-2 having the different resonance frequencies f1 and f2 are disposed one on each side of the single power feeding coil 211. The single power feeding coil 211 can be shared.

In the example shown in FIG. 3, the resonance coils 312-1 and 312-2 having the different resonance frequencies f1 and f2 are disposed one on each side of the single power feeding coil 311. The single power feeding coil 311 can be shared.

Figure 4:
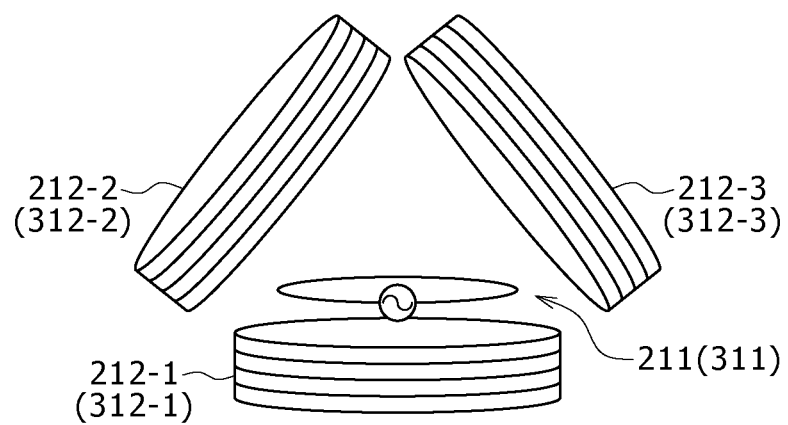
FIG. 4 is a diagram illustrating a second configuration example of the power transmitting or receiving side coils of the wireless power feeding system according to the embodiment of the present invention.

FIG. 4 is a diagram illustrating a second configuration example of the power transmitting or receiving side coils of the wireless power feeding system according to the embodiment of the present invention.

In the example shown in FIG. 4, the resonance coils 212-1 and 212-2 and a resonance coil 212-3 or the resonance coils 312-1 and 312-2 and a resonance coil 312-3 respectively having the frequencies f1 and f2 and a frequency f3 that are different from each other are disposed around the power feeding coil 211 or 311.

Although the number of resonance coils is not limited as shown above, the power transmission efficiency may diminish if the coupling diminishes due, for example, to more spacing between the power feeding coil and resonance coils.

Figure 5:
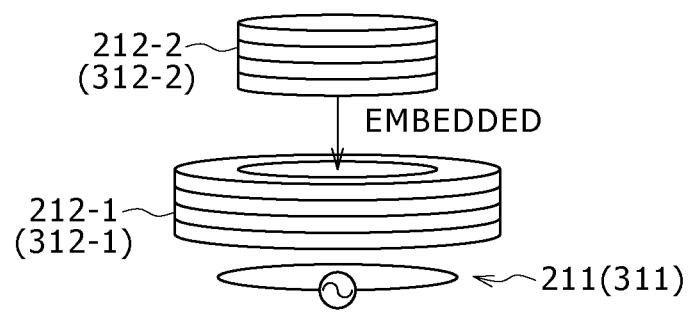
FIG. 5 is a diagram illustrating a third configuration example of the power transmitting or receiving side coils of the wireless power feeding system according to the embodiment of the present invention.

FIG. 5 is a diagram illustrating a third configuration example of the power transmitting or receiving side coils of the wireless power feeding system according to the embodiment of the present invention.

Figure 6:
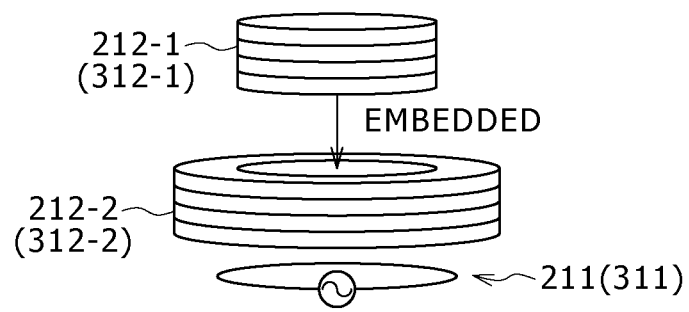
FIG. 6 is a diagram illustrating a fourth configuration example of the power transmitting or receiving side coils of the wireless power feeding system according to the embodiment of the present invention.

FIG. 6 is a diagram illustrating a fourth configuration example of the power transmitting or receiving side coils of the wireless power feeding system according to the embodiment of the present invention.

As illustrated in FIGS. 5 and 6, the plurality of resonance coils 212-1 and 212-2 or 312-1 and 312-2 may be disposed concentrically one above the other.

In the example shown in FIG. 5, the resonance coil 212-2 or 312-2 having the resonance frequency f2 is embedded in the resonance coil 212-1 or 312-1 having the resonance frequency f1.

In the example shown in FIG. 6, the resonance coil 212-2 or 312-2 having the resonance frequency f1 is embedded in the resonance coil 212-1 or 312-1 having the resonance frequency f2.

If the resonance coils are disposed in proximity to each other as described above, the transmission characteristic may degrade due to the coupling of each coil. However, the degradation can be avoided, for example, by expanding the spacing between the operating frequencies (|f2-f1|) or improving the Q factors of the resonance coils for improved frequency selectivity.

Figure 7:
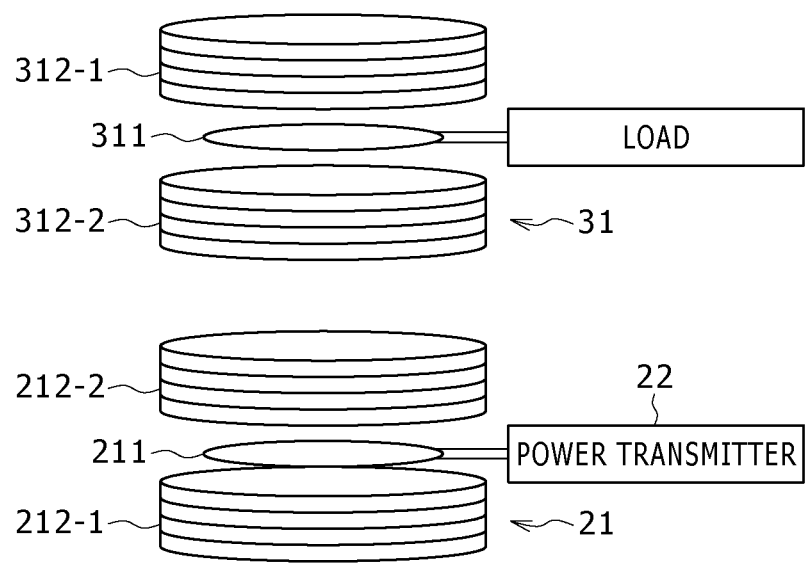
FIG. 7 is a diagram illustrating a fifth configuration example of the power transmitting and receiving side coils of the wireless power feeding system according to the embodiment of the present invention.

FIG. 7 is a diagram illustrating a fifth configuration example of the power transmitting and receiving side coils of the wireless power feeding system according to the embodiment of the present invention.

Although FIGS. 2 to 6 illustrate only the power transmitting or receiving side, the plurality of resonance coils may be disposed on both the power transmitting and receiving sides.

In this configuration, two resonance coils are provided on both the power transmitting and receiving sides, with the resonance coils 212-1 and 212-2 having the resonance frequencies f1 and f2 arranged on the power transmitting side and the resonance coils 312-1 and 312-2 having the resonance frequencies f1 and f2 on the power receiving side.

If it is necessary to separate a signal and power at a plurality of frequencies, the signal and power can be switched for time division with a switch.

On the other hand, if the signal and power can be separated with a filter, a plurality of frequencies can be used at the same time.

Figure 8:
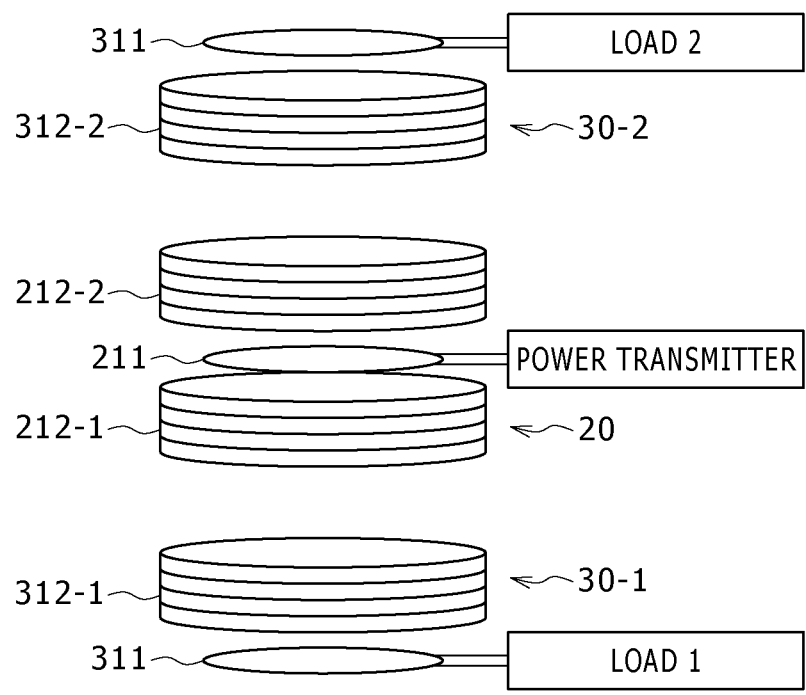
FIG. 8 is a diagram illustrating a sixth configuration example of the power transmitting and receiving side coils of the wireless power feeding system according to the embodiment of the present invention.

FIG. 8 is a diagram illustrating a sixth configuration example of the power transmitting and receiving side coils of the wireless power feeding system according to the embodiment of the present invention.

Figure 9:
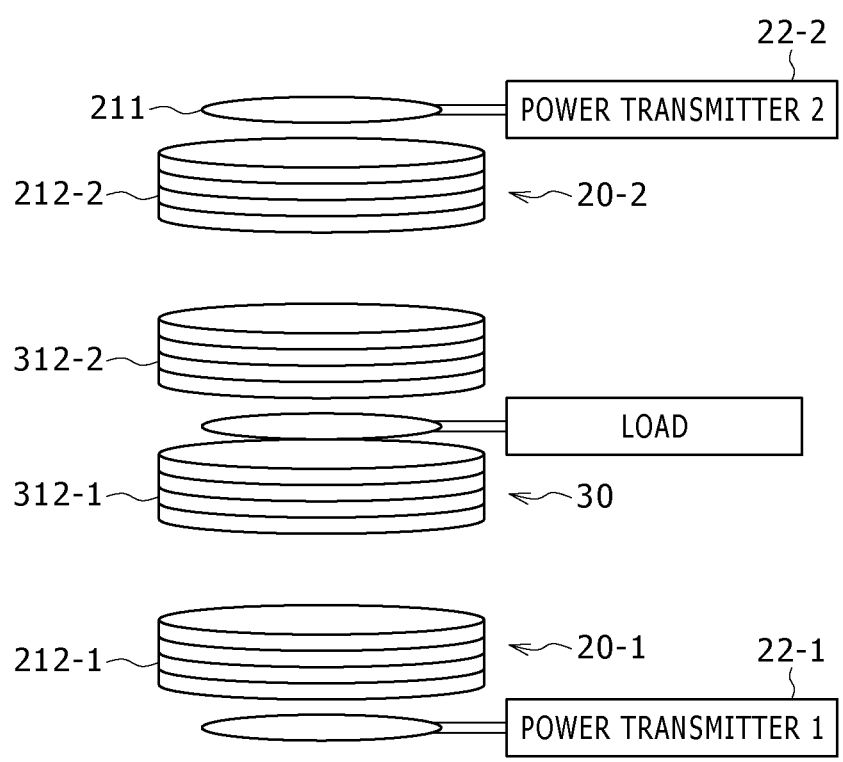
FIG. 9 is a diagram illustrating a seventh configuration example of the power transmitting and receiving side coils of the wireless power feeding system according to the embodiment of the present invention.

FIG. 9 is a diagram illustrating a seventh configuration example of the power transmitting and receiving side coils of the wireless power feeding system according to the embodiment of the present invention.

In the example shown in FIG. 8, the power feeding device 20 includes the two resonance coils 212-1 and 212-2. On the other hand, power receiving devices 30-1 and 30-2 include the resonance coils 312-1 and 312-2 having the resonance frequencies f1 and f2, respectively.

In the example shown in FIG. 9, the power receiving device 30 includes the two resonance coils 312-1 and 312-2. On the other hand, power feeding devices 20-1 and 20-2 include the resonance coils 212-1 and 212-2 having the resonance frequencies f1 and f2, respectively.

A description will be given next of the operation of the coils with primary emphasis on the principle of the magnetic field resonance method and the transmission and reception of power and signal using a plurality of frequencies.

<3. Principle of the Magnetic Field Resonance Method>

A description will be given first of the principle of the magnetic field resonance method with reference to FIGS. 10 to 13.

Figure 10:
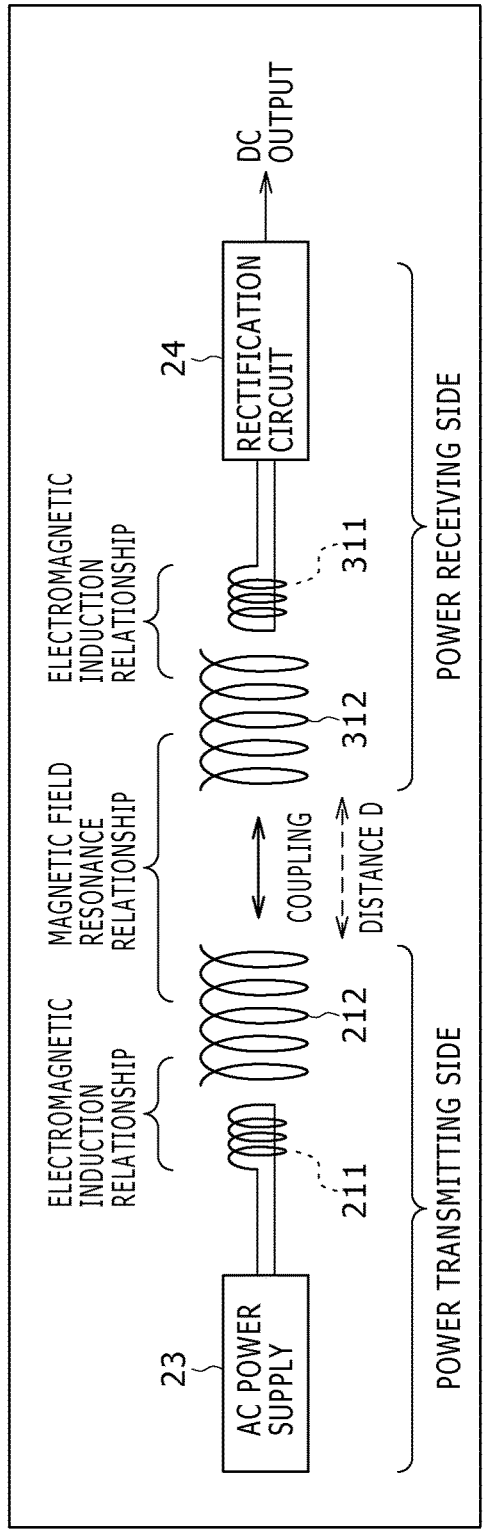
FIG. 10 is a diagram describing the principle of the magnetic field resonance method.

FIG. 10 is a diagram describing the principle of the magnetic field resonance method.

It should be noted that the principle will be described here assuming that the power feeding coil serves a power feeding element and that the resonance coils serve as resonance elements.

The electromagnetic resonance phenomenon can be classified into two types, namely, the electric field resonance method and magnetic field resonance method. Of the two methods, FIG. 10 illustrates a basic block of a wireless (noncontact) power feeding system with one-to-one relationship between the power feeding side and power receiving side.

When considered in association with the configuration shown in FIG. 1, the power feeding side has an AC power source 23 included in the power transmitter 22, the power feeding element 211 and a resonance element 212. The power receiving side has the resonance element 312, power feeding element 311 and a rectification circuit included in the power receiver 32.

The power feeding elements 211 and 311 and resonance elements 212 and 312 are formed with air-core coils.

On the power feeding side, the power feeding element 211 and resonance element 311 are strongly coupled by electromagnetic induction. Similarly, the power feeding element 311 and resonance element 312 are strongly coupled by electromagnetic induction on the power receiving side.

For example, the resonance frequency of the resonance elements 212 and 312 is f1 or f2.

A magnetic field resonance relationship is established when the self-resonance frequencies of the air-core coils, i.e., the resonance elements 212 and 312 respectively on the power feeding and receiving sides, match, providing the maximum coupling level and minimum loss.

An AC current is supplied from the AC power source 23 to the power feeding element 211, further causing a current to be induced in the resonance elements 212 by electromagnetic induction.

The frequency of the AC current generated by the AC power source 23 is set identical to the self-resonance frequency of the resonance elements 212 and 312.

The resonance elements 212 and 312 are disposed in such a manner that a magnetic field resonance relationship is established therebetween. This allows for the AC current to be supplied wirelessly (in a noncontact manner) from the resonance element 212 to the resonance element 312 at the resonance frequency.

On the power receiving side, the current is supplied from the resonance element 312 to the power feeding element 311 by electromagnetic induction, followed by generation and output of a DC current by a rectification circuit 34.

Figure 11:
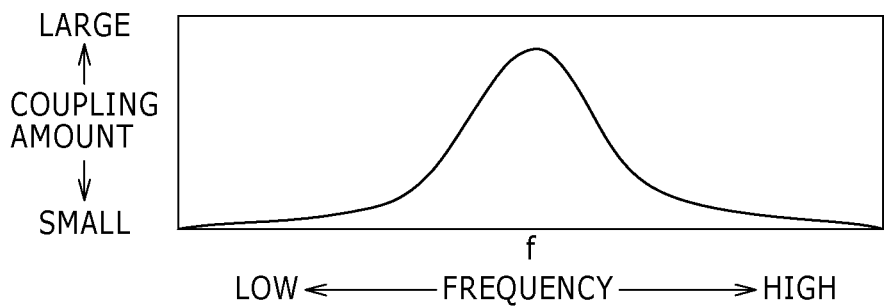
FIG. 11 is a diagram illustrating the frequency characteristic of coupling level in the magnetic field resonance method.

FIG. 11 is a diagram illustrating the frequency characteristic of coupling level in the magnetic field resonance method.

In FIG. 11, the horizontal axis represents the frequency f of the AC power source, and the vertical axis the coupling level.

FIG. 11 illustrates the relationship between the frequency of the AC power source and the coupling level.

It is clear from FIG. 11 that magnetic resonance demonstrates frequency selectivity.

Figure 12:
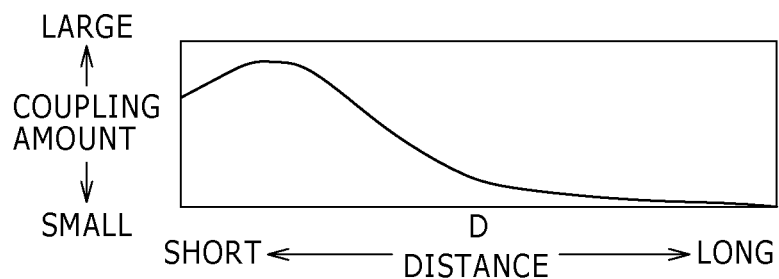
FIG. 12 is a diagram illustrating the relationship between the distance between resonance elements and the coupling level in the magnetic field resonance method.

FIG. 12 is a diagram illustrating the relationship between the distance between the resonance elements and the coupling level in the magnetic field resonance method.

In FIG. 12, the horizontal axis represents a distance D between the resonance elements, and the vertical axis the coupling level.

FIG. 12 illustrates the relationship between the distance D between the resonance element 212 on the power feeding side and the resonance element 312 on the power receiving side and the coupling level.

It is clear from FIG. 12 that the distance D exists where the coupling level is maximum at a given resonance frequency.

Figure 13:
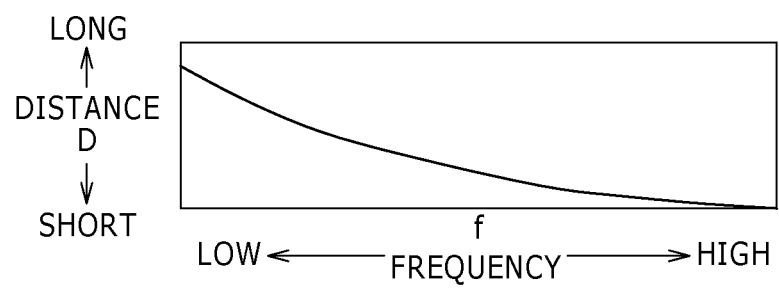
FIG. 13 is a diagram illustrating the relationship between the resonance frequency and the distance between the resonance elements that provides the maximum coupling level in the magnetic field resonance method.

FIG. 13 is a diagram illustrating the relationship between the resonance frequency and the distance between the resonance elements that provides the maximum coupling level in the magnetic field resonance method.

In FIG. 13, the horizontal axis represents the resonance frequency f, and the vertical axis the distance D between the resonance elements.

FIG. 13 illustrates the relationship between the resonance frequency and the distance D between the resonance element 212 on the power feeding side and the resonance element 312 on the power receiving side that provides the maximum coupling level.

It is clear from FIG. 13 that the maximum coupling level can be achieved by widening the gap between the resonance elements when the resonance frequency is low and by narrowing the gap therebetween when the resonance frequency is high.

<4. Operation for Transmission and Reception of Power and a Signal Using a Plurality of Frequencies>

A description will be given below of the operation for transmission and reception of power and a signal using a plurality of frequencies with reference to FIGS. 14 to 19.

Figure 14:
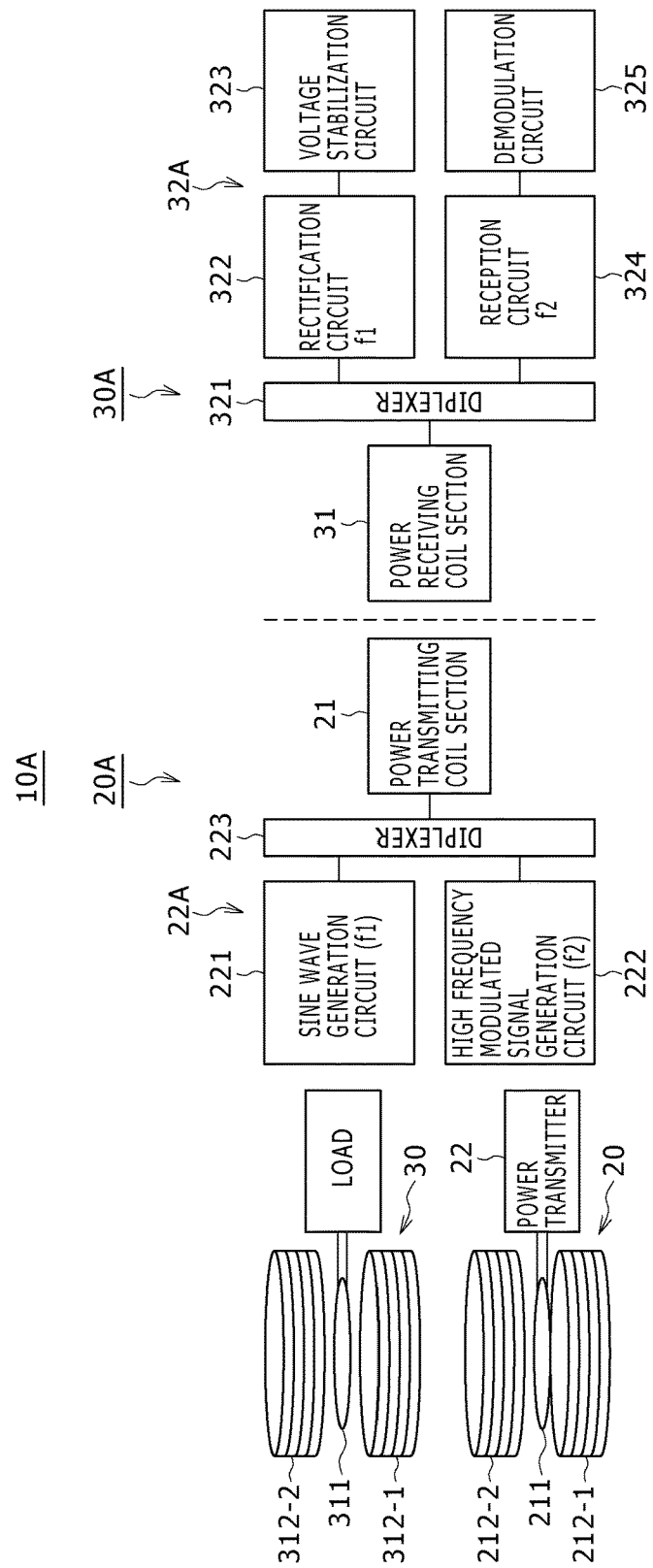
FIG. 14 is a diagram describing a first example of configuration and operation for transmitting and receiving power and a signal using a plurality of frequencies according to the present embodiment.

FIG. 14 is a diagram describing a first example of configuration and operation for transmitting and receiving power and a signal using a plurality of frequencies according to the present embodiment.

In the example shown in FIG. 14, each of a power feeding device 20A and power receiving device 30A includes two resonance coils as illustrated in FIG. 7.

A power transmitter 22A of the power feeding device 20A includes a sine wave generation circuit 221, high frequency modulated signal generation circuit 222 and diplexer 223. The sine wave generation circuit 221 generates a power transmission sine wave at the frequency f1. The high frequency modulated signal generation circuit 222 generates a high frequency modulated signal at the frequency f2.

A power receiver 32A of the power receiving device 30A includes a diplexer 321, rectification circuit 322, voltage stabilization circuit 323, reception circuit 324 and demodulation circuit 325.

In the power feeding device 20A, a power transmission sine wave at the frequency f1 is generated by the sine wave generation circuit 221, and a high frequency modulated signal at the frequency f2 by the high frequency modulated signal generation circuit 222. The sine wave and modulated signal are combined by the diplexer 223 and fed to the double resonance power transmitting coil section 21.

The signal and power received by the power receiving coil section 31 of the power receiving device 30A are separated into the sine wave power at the frequency f1 and the high frequency modulated signal at the frequency f2 by the diplexer 321.

Thereafter, the signal and power are processed by the respective reception circuits to suit the intended applications for use.

The sine wave power is rectified by the rectification circuit 322 and stabilized by the voltage stabilization circuit 323.

The high frequency modulated signal is received by the reception circuit 324 and demodulated by the demodulation circuit 325.

This example is applicable to transmission and reception of power and a signal using two frequencies.

Figure 15:
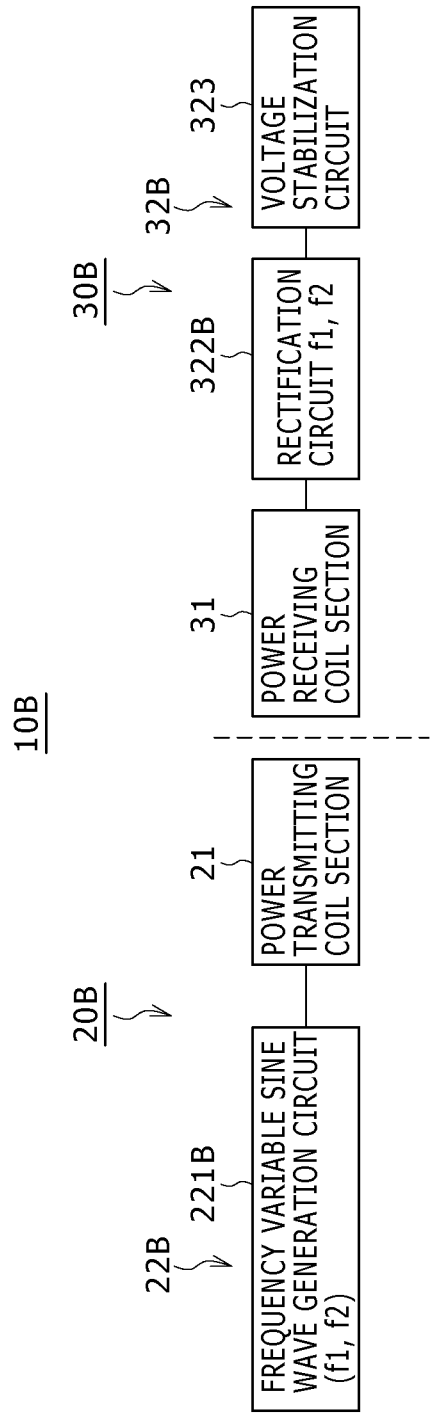
FIG. 15 is a diagram describing a second example of configuration and operation for transmitting and receiving power and a signal using a plurality of frequencies according to the present embodiment.

FIG. 15 is a diagram describing a second example of configuration and operation for transmitting and receiving power and a signal using a plurality of frequencies according to the present embodiment.

In the example shown in FIG. 15, each of a power feeding device 20B and power receiving device 30B includes two resonance coils as illustrated in FIG. 7.

A power transmitter 22B of the power feeding device 20B includes a frequency variable sine wave generation circuit 221B adapted to generate power transmission sine waves at the frequencies f1 and f2.

A power receiver 32B of the power receiving device 30B includes a rectification circuit 322B and the voltage stabilization circuit 323.

In the example shown in FIG. 15, the frequency variable sine wave generation circuit 221B is provided in the power transmitter 22B so that a sine wave can be generated at one of the two frequencies f1 and f2 by switching therebetween.

The resonance coils on the power transmitting and receiving sides are capable of transmitting and receiving power properly at the two frequencies f1 and f2.

The rectification circuit 322B on the power receiving side can operate at these two frequency bands. Therefore, the single rectification circuit 322B suffices. The voltage of the power is stabilized by the voltage stabilization circuit 323, after which the power is supplied to the block at the subsequent stage.

This example is applicable to switching between two frequencies in time to avoid interference to other equipment.

Figure 16:
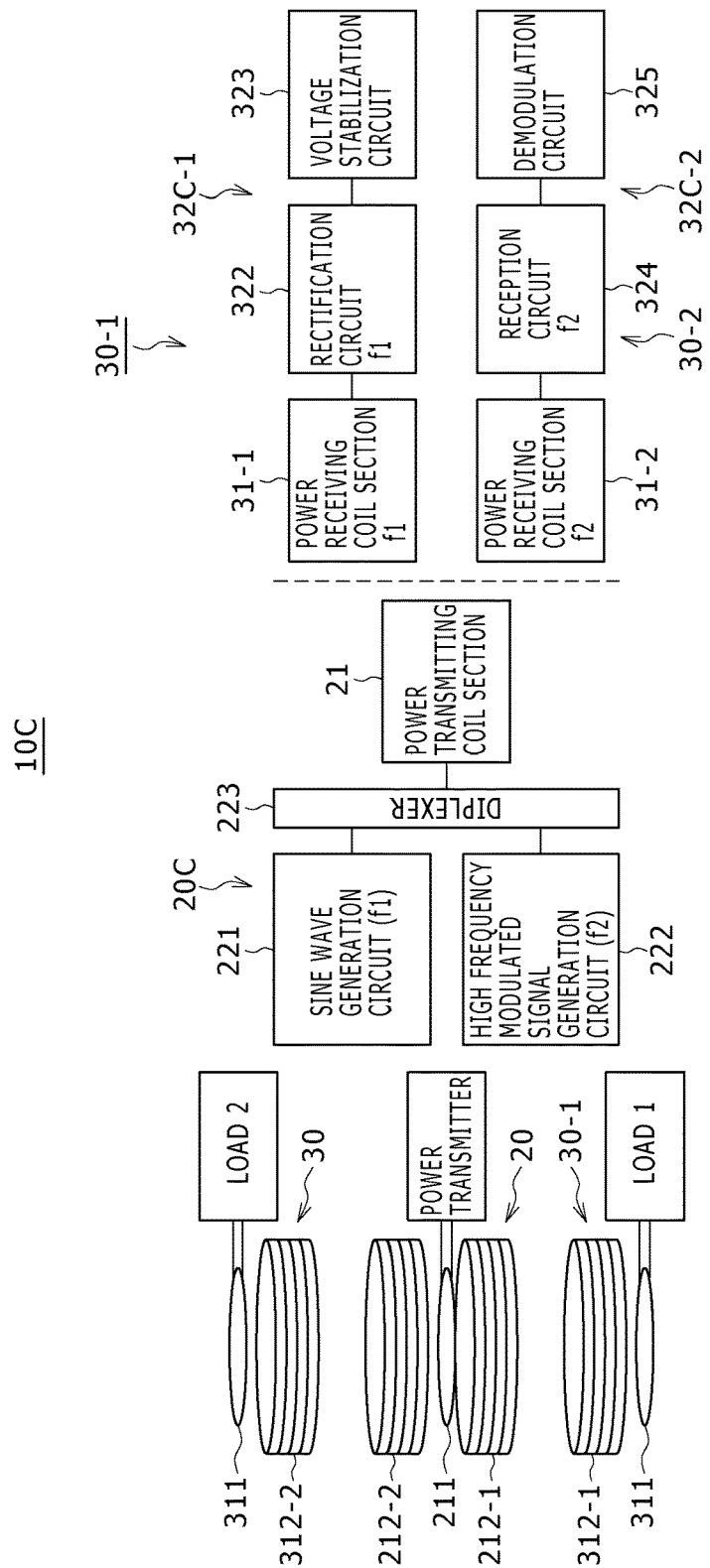
FIG. 16 is a diagram describing a third example of configuration and operation for transmitting and receiving power and a signal using a plurality of frequencies according to the present embodiment.

FIG. 16 is a diagram describing a third example of configuration and operation for transmitting and receiving power and a signal using a plurality of frequencies according to the present embodiment.

In the example shown in FIG. 16, a power feeding device 20C includes the two resonance coils 212-1 and 212-2, and the power receiving devices 30-1 and 30-2 include the resonance coils 312-1 and 312-2, respectively, as illustrated in FIG. 8.

A power transmitter 22C of the power feeding device 20C includes the sine wave generation circuit 221 adapted to generate a power transmission sine wave at the frequency f1, the high frequency modulated signal generation circuit 222 adapted to generate a high frequency modulated signal at the frequency f2 and the diplexer 223.

A power receiver 32C-1 of the power receiving device 30-1 includes the rectification circuit 322 compatible with the first frequency f1 and the voltage stabilization circuit 323.

A power receiver 32C-2 of the power receiving device 30-2 includes the reception circuit 324 compatible with the second frequency f2 and the demodulation circuit 325.

In the power feeding device 20C, a power transmission sine wave at the frequency f1 is generated by the sine wave generation circuit 221, and a high frequency modulated signal at the frequency f2 by the high frequency modulated signal generation circuit 222. The sine wave and modulated signal are combined by the diplexer 223 and fed to the double resonance power transmitting coil section 21.

In the power receiving device 30-1, the sine wave power at the frequency f1 received by a power receiving coil section 31-1 is rectified by the rectification circuit 322 and stabilized by the voltage stabilization circuit 323.

In the power receiving device 30-2, the high frequency modulated signal at the frequency f2 received by a power receiving coil section 31-2 is received by the reception circuit 324 and demodulated by the demodulation circuit 325.

This example is also applicable to transmission and reception of power and a signal using two frequencies.

Figure 17:
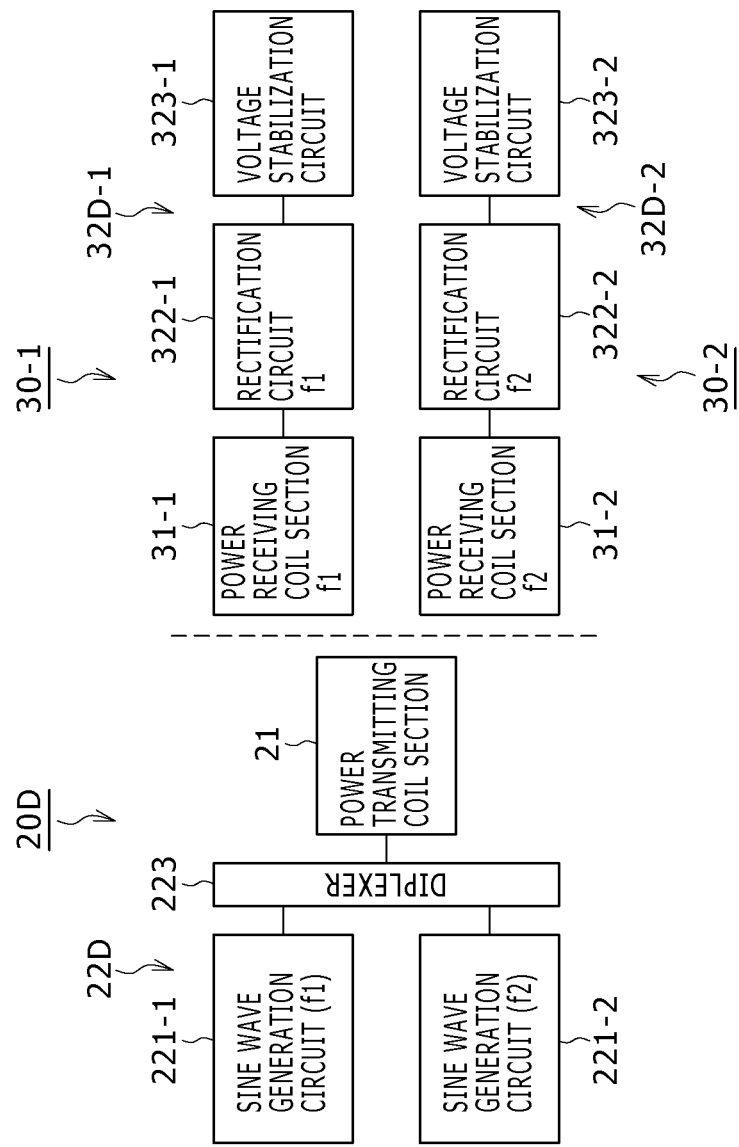
FIG. 17 is a diagram describing a fourth example of configuration and operation for transmitting and receiving power and a signal using a plurality of frequencies according to the present embodiment.

FIG. 17 is a diagram describing a fourth example of configuration and operation for transmitting and receiving power and a signal using a plurality of frequencies according to the present embodiment.

In the example shown in FIG. 17, a power feeding device 20D includes the two resonance coils 212-1 and 212-2, and the power receiving devices 30-1 and 30-2 include the resonance coils 312-1 and 312-2, respectively, as illustrated in FIG. 8.

A power transmitter 22D of the power feeding device 20D includes a sine wave generation circuit 221-1 adapted to generate a power transmission sine wave at the frequency f1, a sine wave generation circuit 221-2 adapted to generate a power transmission sine wave at the frequency f2 and the diplexer 223.

A power receiver 32D-1 of the power receiving device 30-1 includes a rectification circuit 322-1 compatible with the first frequency f1 and a voltage stabilization circuit 323-1.

A power receiver 32D-2 of the power receiving device 30-2 includes a rectification circuit 322-2 compatible with the second frequency f2 and voltage stabilization circuit 323-2.

In the power feeding device 20D, a power transmission sine wave at the frequency f1 is generated by the sine wave generation circuit 221-1, and a power transmission sine wave at the frequency f2 by the sine wave generation circuit 221-2. The two sine waves are combined by the diplexer 223 and fed to the double resonance power transmitting coil section 21.

In the power receiving device 30-1, the sine wave power at the frequency f1 received by the power receiving coil section 31-1 is rectified by the rectification circuit 322-1 and stabilized by the voltage stabilization circuit 323-1.

In the power receiving device 30-2, the sine wave power at the frequency f2 received by the power receiving coil section 31-2 is rectified by the rectification circuit 322-2 and stabilized by the voltage stabilization circuit 323-2.

This example is applicable to transmission and reception of different powers from different sources to different destinations using two frequencies.

Figure 18:
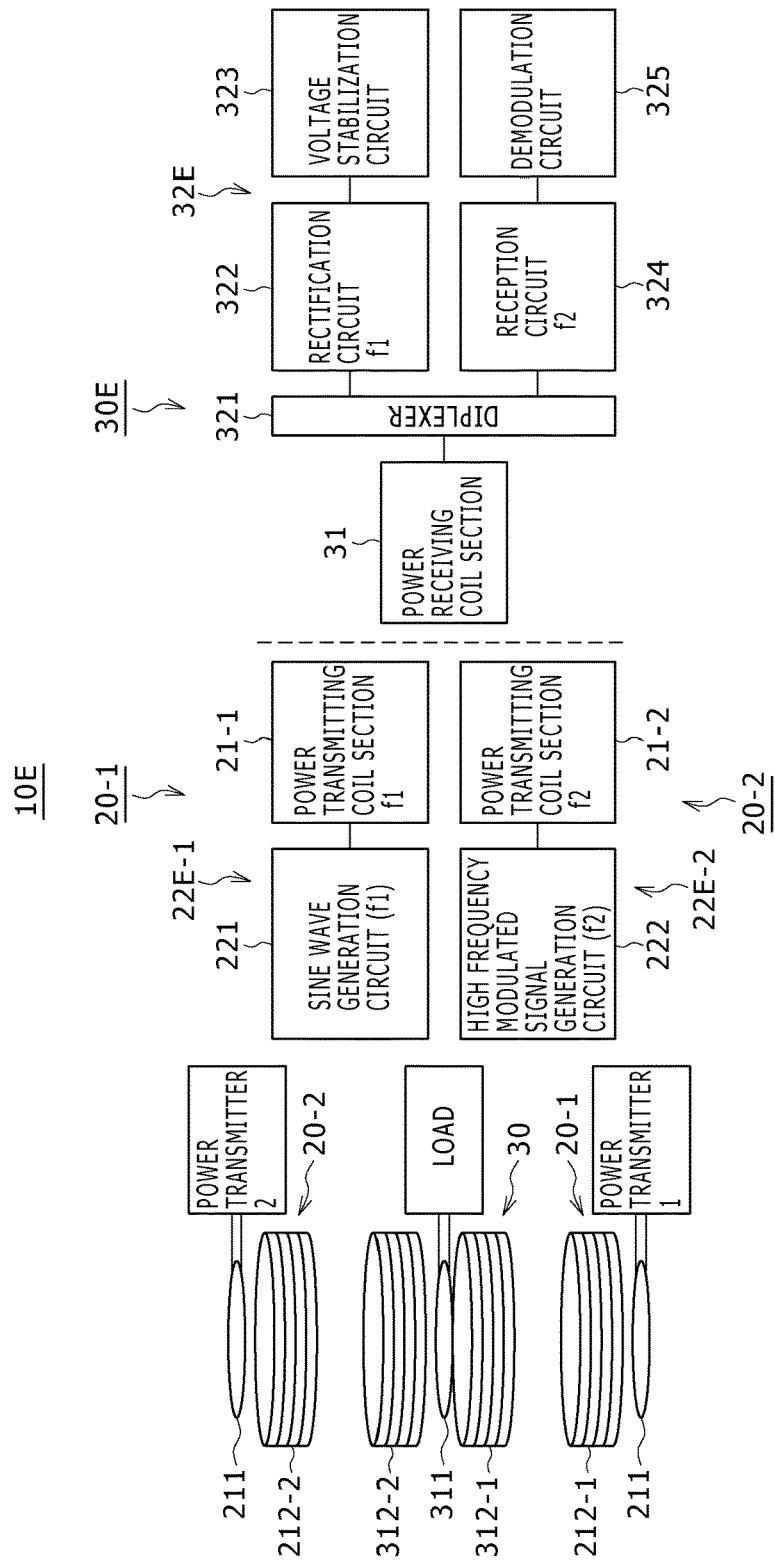
FIG. 18 is a diagram describing a fifth example of configuration and operation for transmitting and receiving power and a signal using a plurality of frequencies according to the present embodiment.

FIG. 18 is a diagram describing a fifth example of configuration and operation for transmitting and receiving power and a signal using a plurality of frequencies according to the present embodiment.

In the example shown in FIG. 18, the power feeding devices 20-1 and 20-2 include the resonance coils 212-1 and 212-2, respectively, and a power receiving device 30E includes the two resonance coils 312-1 and 312-2, as illustrated in FIG. 9.

A power transmitter 22E-1 of the power feeding device 20-1 includes a sine wave generation circuit 221 adapted to generate a power transmission sine wave at the frequency f1.

A power transmitter 22E-2 of the power feeding device 20-2 includes a high frequency modulated signal generation circuit 222 adapted to generate a high frequency modulated signal at the frequency f2.

A power receiver 32E of the power receiving device 30E includes the diplexer 321, rectification circuit 322, voltage stabilization circuit 323, reception circuit 324 and demodulation circuit 325.

In the power feeding device 20-1, a power transmission sine wave at the frequency f1 is generated by the sine wave generation circuit 221 and fed to a power transmitting coil section 21-1.

In the power feeding device 20-2, a high frequency modulated signal at the frequency f2 is generated by the high frequency modulated signal generation circuit 222 and fed to a power transmitting coil section 21-2.

The signal and power received by the power receiving coil section 31 of the power receiving device 30E are separated into the sine wave power at the frequency f1 and the high frequency modulated signal at the frequency f2 by the diplexer 321.

Thereafter, the signal and power are processed by the respective reception circuits to suit the intended applications for use.

The sine wave power is rectified by the rectification circuit 322 and stabilized by the voltage stabilization circuit 323.

The high frequency modulated signal is received by the reception circuit 324 and demodulated by the demodulation circuit 325.

This example is applicable to transmission and reception of power and a signal using two frequencies.

Figure 19:
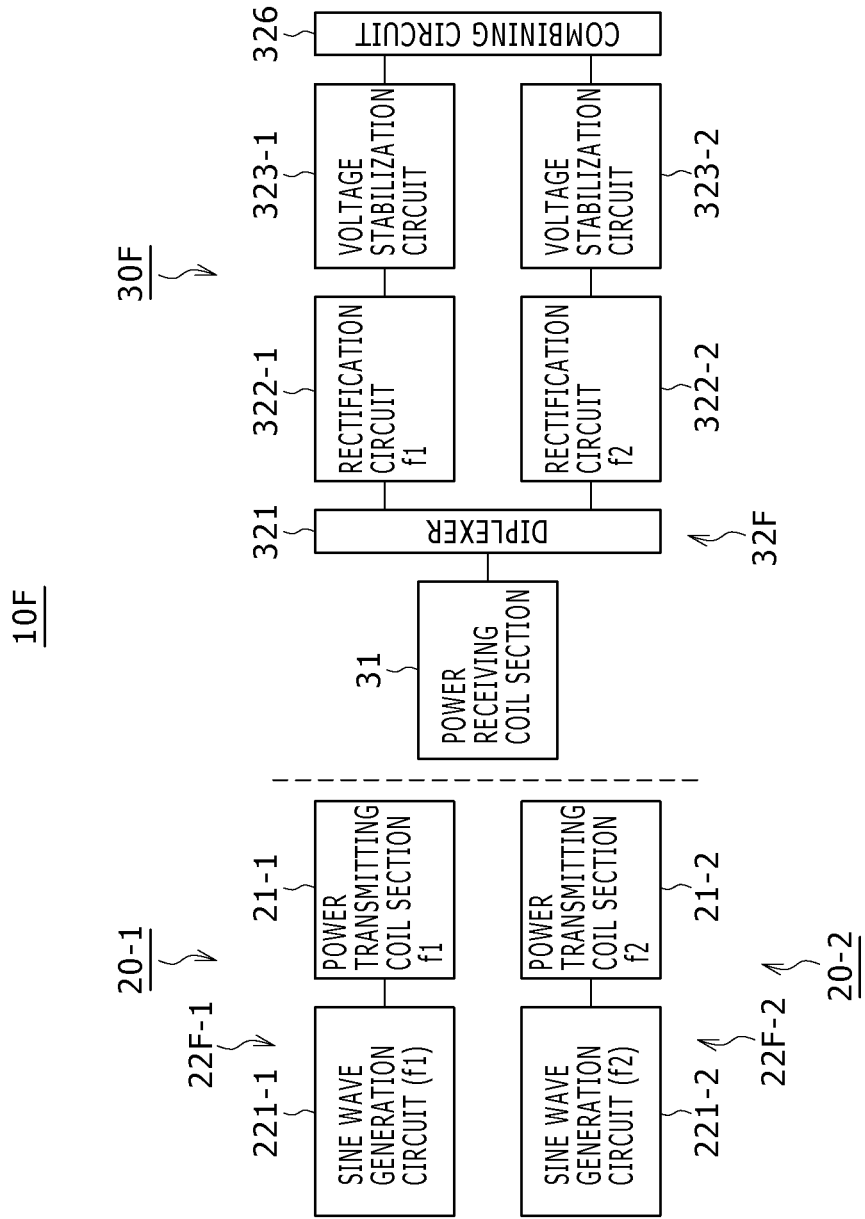
FIG. 19 is a diagram describing a sixth example of configuration and operation for transmitting and receiving power and a signal using a plurality of frequencies according to the present embodiment.

FIG. 19 is a diagram describing a sixth example of configuration and operation for transmitting and receiving power and a signal using a plurality of frequencies according to the present embodiment.

In the example shown in FIG. 19, the power feeding devices 20-1 and 20-2 include the resonance coils 212-1 and 212-2, respectively, and a power receiving device 30F includes the two resonance coils 312-1 and 312-2, as illustrated in FIG. 9.

A power transmitter 22F-1 of the power feeding device 20-1 includes the sine wave generation circuit 221-1 adapted to generate a power transmission sine wave at the frequency f1.

A power transmitter 22F-2 of the power feeding device 20-2 includes the sine wave generation circuit 221-2 adapted to generate a power transmission sine wave at the frequency f2.

A power receiver 32F of the power receiving device 30F includes the diplexer 321, rectification circuits 322-1 and 322-2 compatible respectively with the frequencies f1 and f2, voltage stabilization circuits 323-1 and 323-2 and a combining circuit 326.

In the power feeding device 20-1, a power transmission sine wave at the frequency f1 is generated by the sine wave generation circuit 221-1 and fed to the power transmitting coil section 21-1.

In the power feeding device 20-2, a power transmission sine wave at the frequency f2 is generated by the sine wave generation circuit 221-2 and fed to the power transmitting coil section 21-2.

The two powers transmitted separately and received by the power receiving coil section 31 of the power receiving device 30F are separated into the sine wave power at the frequency f1 and another at the frequency f2 by the diplexer 321.

The sine wave power at the frequency f1 is rectified by the rectification circuit 322-1 and stabilized by the voltage stabilization circuit 323-1.

The sine wave power at the frequency f2 is rectified by the rectification circuit 322-2 and stabilized by the voltage stabilization circuit 323-2.

The two powers each go through their rectification and stabilization circuits. After being converted into DC powers, the two powers are combined by the combining circuit 326 and supplied to the block at the subsequent stage.

This example is applicable to simultaneous reception of powers (e.g., each of which is half the power required for the power receiving side) from two different sources using two frequencies.

As described above, the present embodiment provides the following advantageous effects.

That is, the present embodiment provides coils that can operate at a plurality of frequencies to allow for power to be fed and a signal to be exchanged at the same time and powers to be fed at different frequencies.

A power feeding coil is shared, thus contributing to size reduction.

There is no need to add any additional circuits to the resonance coils, thus maintaining the Q factor high and ensuring high transmission efficiency.

Figure 20:
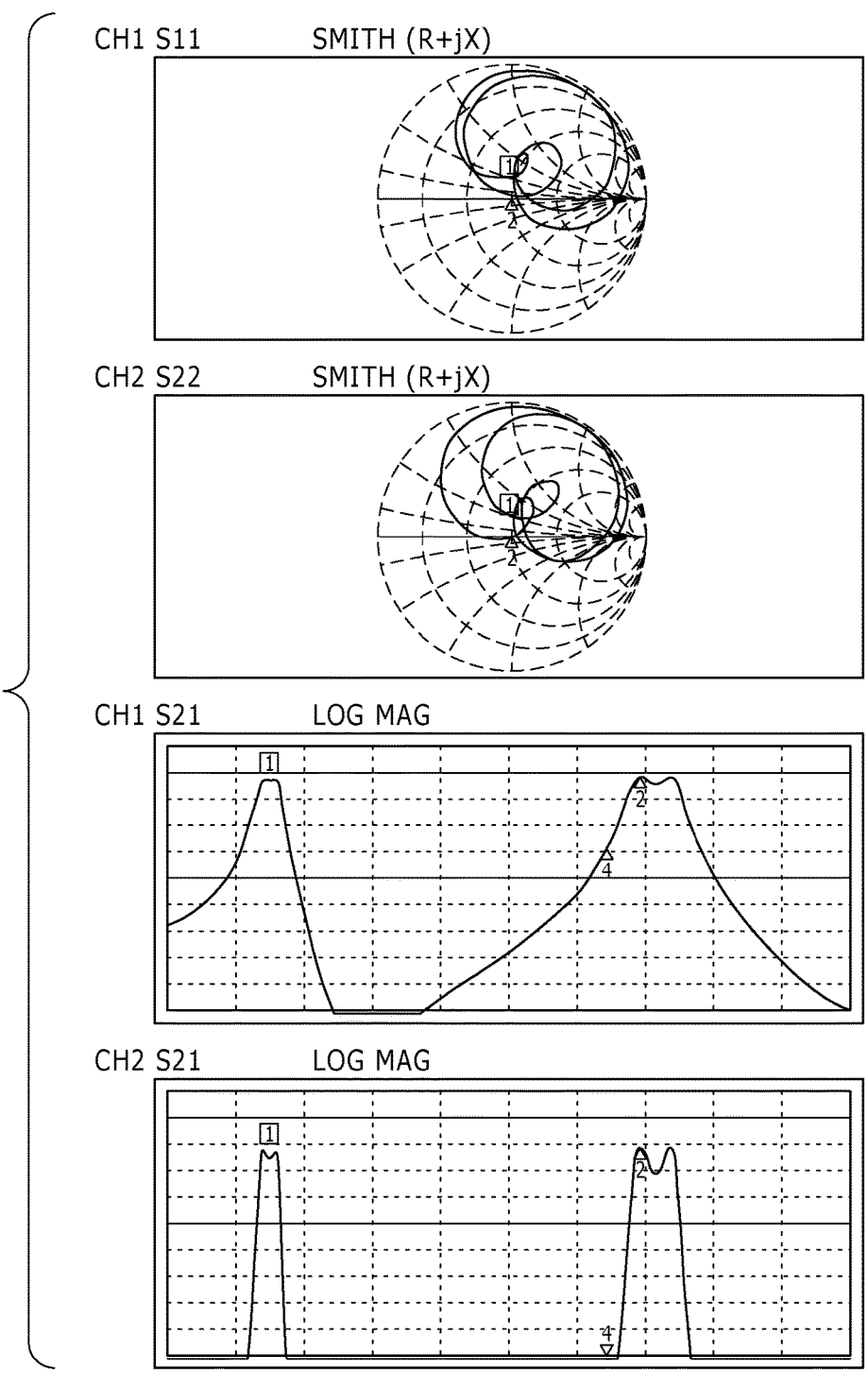
FIG. 20 illustrates Smith charts and frequency characteristics of a device using double resonance coils according to the present embodiment.

FIG. 20 illustrates Smith charts and frequency characteristics of a device using double resonance coils according to the present embodiment.

As is clear from FIG. 20, the present embodiment provides coils that can operate at a plurality of frequencies to allow for power to be fed and a signal to be exchanged at the same time and powers to be fed at different frequencies.

The present application contains subject matter related to that disclosed in Japanese Priority Patent Application JP 2010-006091 filed in the Japan Patent Office on Jan. 14, 2010, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A power feeding device comprising:
a power transmitter configured to generate a plurality of transmission signals having different frequencies from each other, the plurality of transmission signals including at least one power signal corresponding to power;
a power feeding element that is fed with the plurality of transmission signals generated by the power transmitter; and
a plurality of resonance elements that (i) are separate from each other with each having a unique resonance frequency that is different from that of any other resonance element in the plurality of resonance elements, (ii) radiate respective magnetic fields using magnetic field resonance, and (iii) are coupled with the power feeding element and receive from the power feeding element the plurality of transmission signals by electromagnetic induction.

2. The power feeding device of claim 1, wherein the plurality of resonance elements are disposed such that one resonance element is disposed on each side of the power feeding element.

3. The power feeding device of claim 1, wherein the plurality of resonance elements are disposed around the power feeding element.

4. The power feeding device of claim 1, wherein the plurality of resonance elements are disposed concentrically one above the other.

5. The power feeding device of claim 1, wherein the plurality of transmission signals include a modulated signal generated at one frequency and the power signal generated at another different frequency.

6. The power feeding device of claim 1, wherein the plurality of transmission signals include a plurality of power signals having different frequencies from each other.

7. A wireless power feeding system comprising:
a power feeding device, the power feeding device including
(a) a power transmitter configured to generate the plurality of transmission signals having different frequencies from each other, the plurality of transmission signals including at least one power signal corresponding to power,
(b) a power feeding element that is fed with the plurality of transmission signals generated by the power transmitter, and
(c) a plurality of resonance elements that (i) are separate from each other with each having a unique resonance frequency that is different from that of any other resonance element in the plurality of resonance elements, and that (ii) are coupled with the power feeding element and receive from the power feeding element the plurality of transmission signals by electromagnetic induction; and
a power receiving device configured to receive from the power feeding device, via magnetic field resonance, the plurality of transmission signals,
wherein,
in the power feeding device, each resonance element is configured to receive a different transmission signal out of the plurality of transmission signals for transmission at a respective resonance frequency of the resonance element, and
the power receiving device includes at least a second plurality of resonance elements that are separate from each other and configured to receive the plurality of transmission signals from the first plurality of resonance elements via the magnetic field resonance, each resonance element in the second plurality of resonance elements having a unique resonance frequency corresponding to one of the resonance frequencies of the resonance elements in the first plurality of resonance elements.

8. The wireless power feeding system of claim 7, wherein the plurality of transmission signals include a modulated signal generated at one frequency and the power signal generated at another different frequency.

9. The wireless power feeding system of claim 7, wherein the plurality of transmission signals include a plurality of power signals having different frequencies from each other.

10. The wireless power feeding system of claim 7, wherein the power receiving device includes a power receiver configured to process a modulated signal received at one frequency and the power signal received at another different frequency.

11. The wireless power feeding system of claim 7, wherein:
the plurality of transmission signals include a plurality of power signals having different frequencies from each other, and
the power receiving device includes a power receiver configured to process the plurality of power signals at the different frequencies.

* * * * *